United States Patent [19]

Damson et al.

[11] Patent Number: 4,514,656
[45] Date of Patent: Apr. 30, 1985

[54] COMBINATION SPARKPLUG AND COMBUSTION PROCESS SENSOR

[75] Inventors: Eckart Damson, Stuttgart; Reinhard Latsch, Vaihingen; Ernst Linder, Mühlacker; Franz Rieger, Aalen; Rainer Schüssler, Bietigheim, all of Fed. Rep. of Germany

[73] Assignee: Robert Bosch GmbH, Stuttgart, Fed. Rep. of Germany

[21] Appl. No.: 428,003

[22] Filed: Sep. 29, 1982

[30] Foreign Application Priority Data

Nov. 28, 1981 [DE] Fed. Rep. of Germany ....... 3147291

[51] Int. Cl.³ ...................... H01T 1/12; H01T 13/16; H01T 13/48
[52] U.S. Cl. .................................. 313/11.5; 313/110; 313/118; 313/129
[58] Field of Search ............... 313/129, 141, 118, 136, 313/11.5, 110; 350/96.1

[56] References Cited

U.S. PATENT DOCUMENTS

| 2,684,665 | 7/1954 | Tognola | 313/11.5 X |
| 2,837,679 | 6/1958 | Schwartzwalder et al. | 313/11.5 X |
| 4,393,687 | 7/1983 | Müller et al. | 313/129 X |

Primary Examiner—David K. Moore
Assistant Examiner—K. Wieder
Attorney, Agent, or Firm—Frishauf, Holtz, Goodman & Woodward

[57] ABSTRACT

To permit adjustment of the combination sparkplug-optical sensor for heat transfer upon operation of the sensor-sparkplug combination as a sparkplug, in accordance with known sparkplug technology, the insulator of the sparkplug is formed with a central opening in which a material is included which is electrically conductive and providing for controlled heat transfer, for example a packing or a mixture of aluminum oxide with a conductive powder, such as graphite, aluminum, or copper; or, alternatively, sheet metal elements may be located therein providing controlled radial engagement around a central glass rod forming the optical sensor and the inner wall of the opening and the insulator (FIG. 2); or, alternatively, axially resilient elements, such as a bellows-like corrugated metal element (FIG. 3) or a stack of spring disks (FIG. 4) may be positioned in the opening, axially biased by screwing the connecting terminal (10) into a tapped opening of the insulator. Heat transfer or transmission control is effected by introducing between metallic components of the combination and the glass rod a heat conductive mass (2) which fills the space between the glass rod and the metallic components over a predetermined length, in accordance with desired heat transfer characteristics.

18 Claims, 9 Drawing Figures

COMBINATION SPARKPLUG AND COMBUSTION PROCESS SENSOR

Reference to related application, assigned to the Assignee of this invention, the disclosure of which is hereby incorporated by reference: U.S. Ser. No. 214,481, filed Dec. 9, 1980, now U.S. Pat. No. 4,393,687, issued July 19, 1983, Klaus Müller et al. U.S. Ser. No. 427,181 filed Sept. 29, 1982, Damson et al, Title: Spark Plug and Optical Combustion Sensor Combination Claiming priority German Application No. P 31 47 290.7, Nov. 28, 1981.

The present invention relates to a sparkplug-combustion sensor combination, and more particularly to a sparkplug combined with an optical sensor to provide optical signals representative of combustion events within the combustion chamber of an internal combustion engine, for example to evaluate the signals to prevent knocking or pinging of the engine if it is operated close to the knock limit.

BACKGROUND

The referenced application Ser. No. 214,481, filed Dec. 9, 1980, Klaus Müller et al, the disclosure of which is hereby incorporated by reference, describes a sensor positioned in a sparkplug-like housing which is capable of being secured through the cylinder wall of an internal combustion engine. The sensor can sense the pressure conditions which occur in the combustion chamber upon ignition of the air-fuel mixture therein.

Combining such a sensor operational with a sparkplug has the advantage of being space-saving, and of being readily connected. This, then, requires an electrical conduction line in addition to the optical transmission or optical guide, so that ignition energy can be supplied to the unit, to form a combined sparkplug-sensor element. In a system which has been proposed, a metallic sleeve is provided within which a glass rod, or glass fiber element is located. Typically, quartz glass may be used.

The operation of sparkplugs by themselves is well known; sparkplugs, in operation, have different characteristics which are matched to the operating characteristics of the internal combustion engine, and the use to which the engine is put—for example whether it is used to drive an automotive vehicle of the passenger car type, a motor cycle, a truck, or if the combustion engine is used for small applications, such as chain saw or a lawn mower. Different characteristics are demanded of the sparkplug, thus, depending on operating loading, use, compression, speed, cooling available, setting of the carburetor or fuel injection system and the like. Consequently, the construction of sparkplugs must be matched to the engine, and it is known that, even with any type of engine, sparkplugs with different heat capacity or heat characteristics can be used. Using, for example, a sparkplug of identical construction in an engine in which the sparkplug would become highly heated, the sparkplug may become too hot and the fuel-air mixture could be ignited by elements of the sparkplug which start to glow, resulting in misfires, or glow firing, which is undesirable. If, on the other hand, the same sparkplug is installed in a different engine in which it is operated at a relatively low average temperature, the tip of the sparkplug insulator would be rapidly carbonized due to residues from combustion, and, if carbonization becomes excessive, the ignition energy may become shunted through the carbon deposits resulting in failure of ignition, and again misfires. Consequently, matching of the sparkplug to a particular engine, and its operating conditions, is important, since the sparkplug in a specific motor should become neither too hot, nor remain too cold. It is, therefor, known to provide sparkplugs with different thermal loading or heat characteristics. These different thermal characteristics, which can be referred to as "heat loading" of the sparkplug, are values which are associated with each sparkplug and based on the design thereof, so that interchangeable sparkplugs can be constructed to match any particular type of engine in the light of its operating characteristics.

When combining an optical sensor with a sparkplug, it has been found that the heat capacity thereof, or the heat characteristic, is such that the sparkplug, in operation, may overheat at the operating tip. The heat capacity of the sparkplug is low, since the glass rod in the center thereof is a poor heat conductor. The sparkplug tip, thus, will heat excessively by not being able to radiate the resulting heat. If the sparkplug is installed in an internal combustion engine which is operated at high power rating, the sparkplug may become excessively hot at the tip and glow-ignition may result, which, in effect, means that the engine will be subject to misfires.

THE INVENTION

It is an object to provide the combined sparkplug-combustion process sensor, providing optical signals, which permits operation at desired temperatures in accordance with standard sparkplug design requirements, and in which, particularly, overheating of the tip is effectively prevented.

Briefly, heat transfer control means are positioned between a metal jacket or sleeve and the optical transmissive glass rod, the metal means for example being a metallic sleeve of high-temperature resistant material, for example steel, preferably alloyed with nickel-chromium, or a pure nickel sleeve; the heat transfer control means comprises a heat conductive body, located between the glass rod and the metal sleeve, for example a ceramic cement or the like, the length and thickness of the heat conductive body being selectively controlled in accordance with the desired eventual characteristics of the sparkplug.

Heat can additionally be transferred through a packing of compacted electrically conductive powder, for example a mixture of aluminum oxide with graphite, pulverized aluminum, copper or the like; or, interposed metallic spacer elements can be used in various shapes, for example as spring elements providing radial pressure and heat transfer, or located, axially stacked, within a hollow space in the sparkplug.

The sensor has the advantage that its heat characteristics can be controlled within wide ranges, so that sparkplug-sensor combinations with different thermal characteristics can readily be constructed for matching to various types of internal combustion (IC) engines.

The particular construction of the sensor provides a wide variety of possibilities to control the heat transfer characteristics of the sensor-sparkplug combination by suitable selection of the dimensions of various components, for example of a conductive pulverized packing mixture, or the air gap between a metal portion and the insulator body of the sparkplug. Additionally, and as desired and in a suitable and advantageous construction, special heat conductive elements can be introduced between the glass rod and the insulator, or between the insulator and the metal housing, preferably made of spring material to be able to compensate for different thermal expansion characteristics.

DRAWINGS

Figure 1:
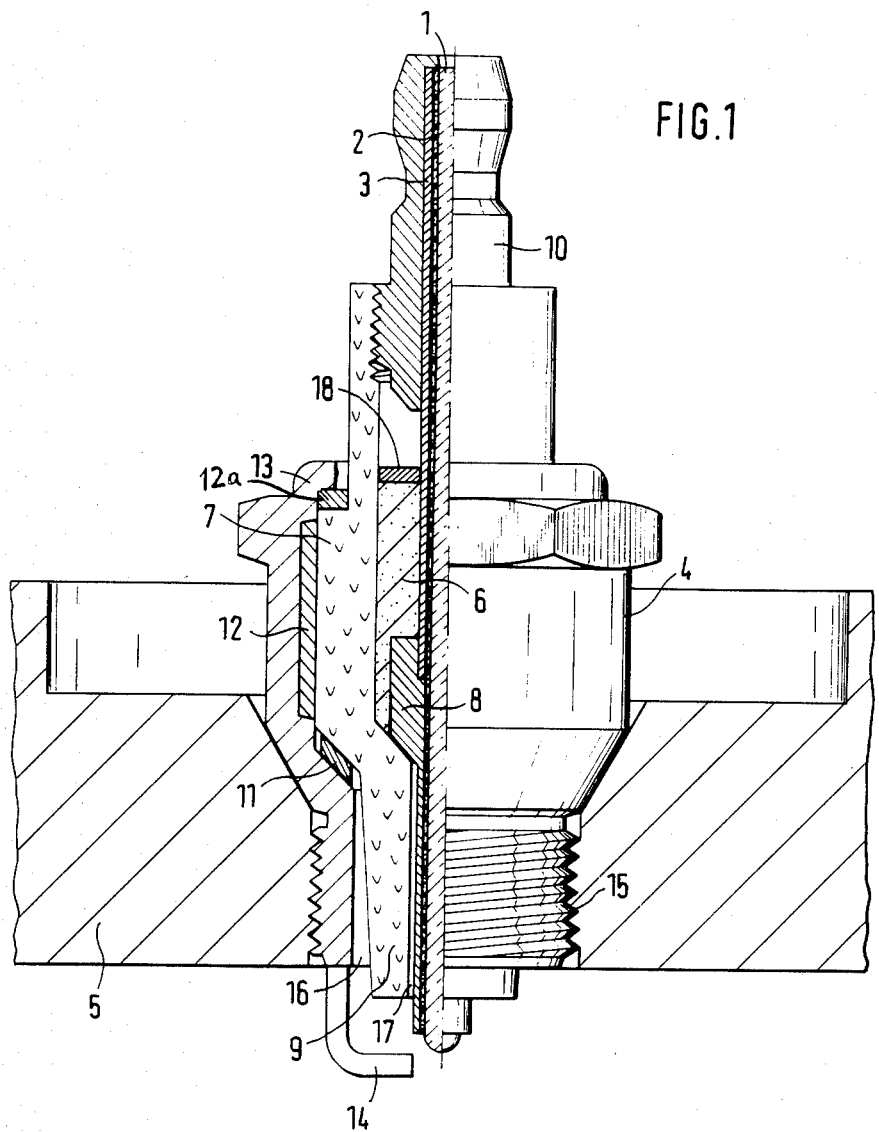
FIG. 1 is a schematic, longitudinal view, half in section, of a combined sparkplug-optical sensor.

The sensor-sparkplug combination is inserted through a suitably tapped opening in the engine block 5 of an internal combustion (IC) engine. The metal housing 4 has a ground or chassis electrode 14 secured at the combustion chamber end thereof which, together with the sleeve 8, forms a spark gap for the sparkplug which, functionally, is combined with the sensor. The sleeve 8 is surrounded by an insulator 7 which has an end or termination portion 9. The insulator 7 has a connecting end tip 10 threaded therein, in order to provide a connection terminal for ignition energy. A packing 6 made of conductive material is located within a central opening in the insulator 7. The packing 6 is covered, at its top, by a plate 18.

A suitable material for the packing 6 is a compacted electrically conductive powder, for example a mixture of aluminum oxide with graphite, aluminum powder or copper powder. A suitable material for the sleeve 8 is steel, particularly nickel-chromium alloy steel, or nickel.

The insulator 7 is axially supported in the metal housing 4 by a sealing ring 11 and is retained within the metal housing by a turned-over edge 13 formed at the upper end thereof. Radially, a heat conductive section 12 forms a heat transfer controlled element, and heat conductive bridge between the ceramic 7 and the metal housing 4. A cooling, or breathing space 16 is formed between the lower portion 9 of the insulator and the metal housing 4. The housing, insulator and other elements are, in cross-section, essentially circular, so that the space 16 is, essentially ring-shaped. An air gap 17 is provided between the inner bore or opening of the insulator 7 and the combustion chamber end portion of the sleeve 8. Sleeve 8, preferably, has a second upper portion, as clearly seen in FIG. 1.

OPERATION—OPTICAL OBSERVATION

Optical observation of combustion events within the combustion chamber of the IC engine can be effected by optically coupling a transducer to the centrally positioned glass rod 1.

OPERATION—ELECTRICAL

Ignition energy is applied to the connecting terminal 10, conducted over the metallic tube or sleeve 3 seated within the packing 6 and fitted against the tube 8, to be conducted in close proximity to the ground or chassis electrode 14, separated therefrom by a spark gap. The end portion of the optical sensor 1 can be formed in various ways, for example capped as shown, or otherwise to reduce the danger of contamination and soot deposit.

ADJUSTMENT OF HEAT FACTOR AND HEAT TRANSFER CHARACTERISTICS

Various possibilities present themselves to control the heat characteristics of the combined sparkplug sensor.

(1) the space between the glass rod 1 and the sleeve 3, or between the glass rod 1 and the igniter tube 8 can be filled over more or less of the longitudinal extent of the combination sensor sparkplug, and with more or less thickness. A suitable material for a heat conductive filler or mass is a ceramic cement or mastic, commercially available for example under the trade name "Thermoguss 2000" (Thermocast 2000). By control of the length and thickness of the filler of the mass 2, heat transfer, particularly at the combustion chamber end, can be controlled, so that heat removal adjacent the spark gap can be controlled.

The axial length of the packing 6 can be adjusted, by filling more or less packing material, and positioning the plate 18 such that in the central portion of the sensor a previously desired heat transfer path is provided.

The length of the end portion 9 of the ceramic insulator 7, the width and shape of the breathing space 16, and the width, shape and length of the air gap 17 can be separately controlled—as known from sparkplug technology, so that a suitable heat transfer characteristic at the ignition end, or combustion chamber end portion of the combination sensor-sparkplug can be obtained.

In accordance with a particularly preferred embodiment of the invention, heat transfer between the ceramic elements 7 and the metal housing can be predetermined by providing suitable heat conductive sealing rings 11, varied in radial extent as well as thickness, to provide predetermined heat transfer; the radial extent and the thickness of the outer heat transfer sleeve 12, typically of metal, and a possible similar heat transfer sleeve 12a, beneath the rolled-over end of the thickness 13, likewise permit control of the heat transfer characteristics.

Any one of the aforementioned parameters which have an effect on the heat transfer can be suitably arranged or varied to provide, by combination of appropriate dimensions and materials, different heat values within wide ranges for sparkplug-sensor combinations of predetermined sizes.

EMBODIMENT OF FIG. 2

The general construction of the sparkplug-sensor combination is similar to that described in connection with FIG. 1, and similar parts will not be described again and will be given the same reference numerals, to the extent appropriate, with additional identification notation.

Figure 2A:
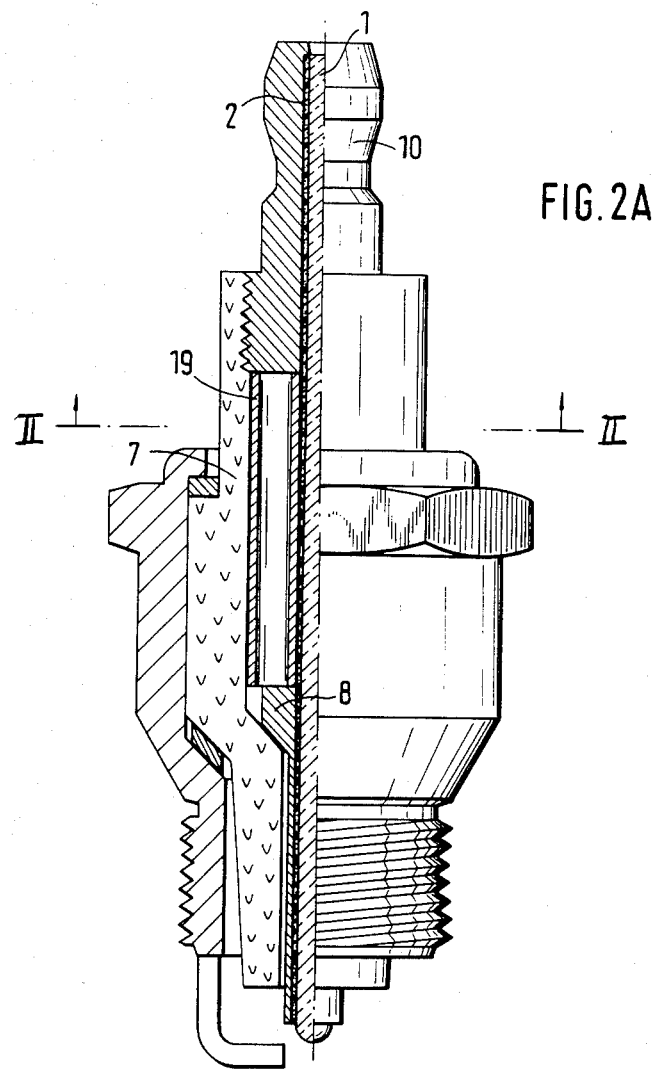
FIG. 2A is a view similar to FIG. 1 illustrating a different embodiment.
Figure 2B:
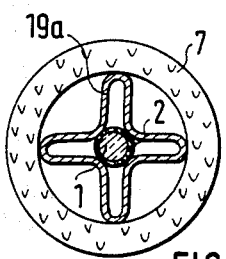
FIGS. 2B, 2C, 2D are cross-sections along lines II—II of FIG. 2A and show different embodiments of spacer elements.
Figure 2C:
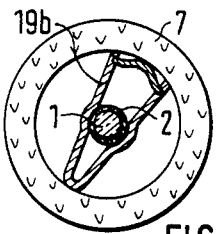
Figure 2D:
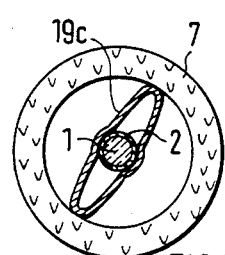

In lieu of the packing 6 in the embodiment of FIG. 1, radially effective spacer elements 19 are provided; the spacer elements 19 are radially resilient sheet metal elements shown, in detail, in the cross-sectional views of FIGS. 2B, 2C, 2D. The shapes of these radially resilient sheet metal elements 19a, 19b, 19c can be as desired—in accordance with FIG. 2B, essentially cross-shaped, in accordance with FIG. 2C, a V-shaped element 19b with a central bulge to fit around sleeve 3, or the mass 2, or, in accordance with FIG. 2D, an elliptical element with a central bulge. These sheet metal elements engage around the glass rod 1 or, respectively, the heat conductive mass 2 whereover, on the one hand, and on the other, at the inner wall of the central opening in the insulator 7. The length, shape, and surface contact areas of the respective sheet metal elements 19a,19b,19c, the axial extent of engagement of the elements along the glass rod 1 or, rather, the heat conductive mass 2, and the axial extent and radial extent of engagement with the insulator 7 can be varied to control heat transfer by the sheet metal element 19, and thus the heat radiating characteristics of the sparkplug-sensor combination. The outer, radially placed heat transfer element 12 is not necessary, and as seen in FIG. 2A, it can be omitted. Electrical continuity is established by engagement of the terminal element 10 where at least a portion or wing of the sheet metal element 19 extends longitudinally through the length of the opening space to form a connection between contact terminal 10 and the heat resistant tube 8, preferably at the enlarged inner end thereof.

EMBODIMENT OF FIG. 3

Similar to the embodiment of FIG. 2, the central portion of the sensor has a resilient sheet metal element placed therein. As shown, it is formed by a corrugated sheet metal element 20, axially biased, and supporting the tube 8 at the upper enlarged end thereof, axially on the one end, and with the other bearing against the inner portion of the terminal connector 10. The sheet metal element 20 is corrugated and engages the inner walls of the insulator 7 at selected positions. The sheet metal element 20 also engages the glass rod 1 or, rather, the heat conductive mass 2 along predetermined axial length, and with predetermined radial contact. Heat transfer, thus, is controlled and will extend from the radially enlarged terminal portion of the tube 8 to the sheet metal element 20 and from there to the rather massive metallic contact terminal 10, as well as to the insulator 7. The stretched length of the element 20, that is, the number of corrugations, can be suitable selected, so that, again, the heat transfer characteristics of the sparkplug can be readily predetermined.

EMBODIMENT OF FIG. 4

Figure 3A:
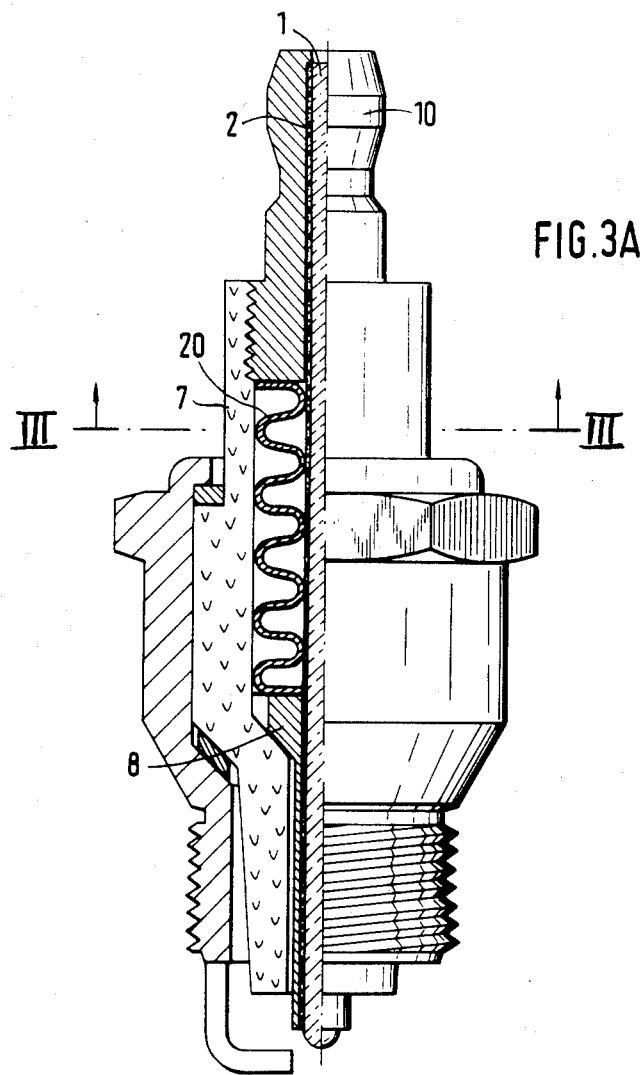
FIG. 3A is a view similar to FIG. 1 illustrating a different embodiment.
Figure 3B:
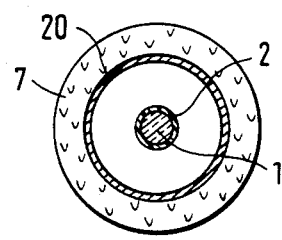
FIG. 3B is a cross-section along lines III—III of FIG. 3A.

The general structure is similar to the embodiment of FIG. 3 with the difference, however, that the corrugated sheet metal element 20 has been replaced by a stack of disc springs 21 which, among each other, provide for heat transfer between the tube 8, and specifically between the enlarged upper end thereof, the insulator 7, and the metallic terminal tap 10. As in FIG. 3, the spring elements 20,21 also provide for electrical connection between the terminal 10 and the tube 8.

Figure 4A:
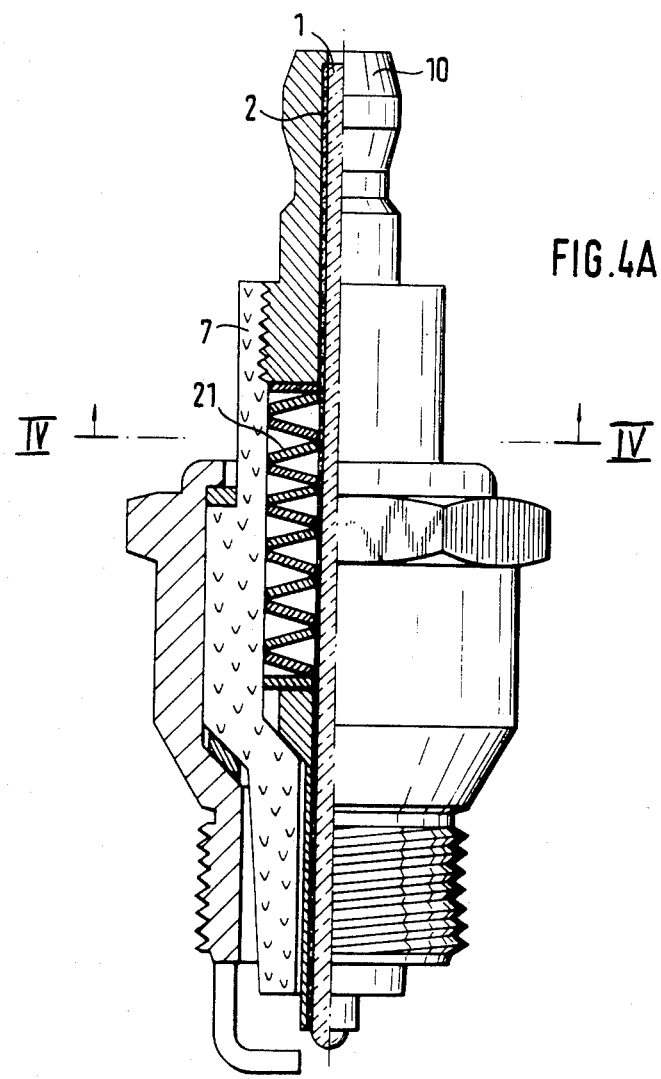
FIG. 4A is a view similar to FIG. 1 illustrating a different embodiment.
Figure 4B:
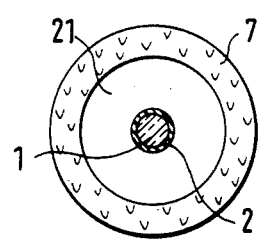
FIG. 4B is a cross-section along lines IV—IV of FIG. 4A.

The arrangement in accordance with FIGS. 3 and 4 has the advantage that the connecting bolt 10, screwed into the insulator 7, provides for axial bias to hold the tube 8, and hence the glass rod 1, reliably in position. The elements 20, 21 seal the optical sensor with respect to the combustion gases which, at the time of ignition, are under high pressure. This avoids the necessity to adhesively connect the glass rod 1 into a tube 3, or into one of the sheet metal elements or into the tube 8, which is required for reliable operation in the embodiments of FIGS. 1 and 2.

Preferably, the end portion of the connecting terminal 10 overlaps and extends over the glass rod 1 as a terminal protection therefor, which likewise protects the mass 2 from contamination, moisture and the like.

Various changes and modifications may be made and features described in connection with any one of the embodiments may be used with any of the other, within the scope of the inventive concept.

We claim:

1. Combination sparkplug and combustion process sensor with a selected heat transfer characteristic, having
    a metallic housing (4) including means (15) for securing the housing in an engine block (5) of an internal combustion engine;
    an insulating body (7) secured in the housing, and formed with a central opening;
    a glass rod (1) forming a light guide, centrally extending through the opening in the insulating body;
    metallic means (3,8,10), at least in part surrounding the glass rod, to carry electrical ignition energy through the insulating body;
    and comprising, in accordance with the invention,
    means for matching the heat transfer characteristic of said combination to operating requirements of said engine by controlling heat transfer between the metal means, the glass rod (1), the insulating body (7) and the housing (4) including
    a heat conductive mass (2) located between the glass rod (1) and the metal means (3,8,10) and extending therebetween through a predetermined controlled distance along the length of the glass rod and the metal means; and
    at least one electrically conductive heat transfer element (6,19,20,21) located between said metallic means (3,8,10) and said insulating body (7) to provide heat conduction therebetween.

2. Combination according to claim 1, wherein the metal means comprises a metal sleeve (8) surrounding the glass rod in the region of the combination adapted for positioning within the engine block (5) and exposed to a combustion chamber therein, said metal sleeve comprising high-temperature resistant material.

3. Combination according to claim 2, wherein said metal sleeve comprises at least one of the materials of the group consisting of:
    high-temperature steel; nickel-chromium alloy steel; nickel.

4. Combination according to claim 1, wherein the heat conductive mass comprises a ceramic cement.

5. Combination according to claim 2, further including a metallic connecting terminal (10) having a central opening therein, secured into the insulating body at the side of the combination remote from the engine block;
    and electrically conductive controlled heat transfer means positioned in contact with the high-temperature resistant sleeve (8), the inner wall of the insulating body defining said central opening, and electrically connected with said connection terminal (10).

6. Combination according to claim 5, wherein (FIG. 1) said controlled heat transfer means further comprises a packing (6) of compacted electrically conductive powder.

7. Combination according to claim 6, wherein said electrically conductive compacted powder comprises aluminum oxide having mixed therein at least one of the materials of the group consisting of graphite, aluminum powder; copper powder.

8. Combination according to claim 6, wherein the axial length of the packing is predetermined to control the heat characteristics of said combination.

9. Combination according to claim 1, wherein the insulating body (7) terminates in a terminal portion (9) at the end of said combination adapted for placement within a combustion chamber, the length of the terminal portion (9) being predetermined to control the heat transfer characteristics of said combination.

10. Combination according to claim 9, further including a breathing space (16) of predetermined volume between the terminal portion (9) of the insulating body (7) and the adjacent end portion of the housing (4).

11. Combination according to claim 2, wherein the insulating body (7) is formed with a terminal portion (9) of predetermined length to control the heat transmission characteristics of said combination;

and wherein the diameter of the opening in the insulating body at the terminal portion (9) is greater than the outer diameter of said sleeve, to leave a gap of predetermined volume for additional control of the heat transmission characteristics of said combination.

12. Combination according to claim 5, wherein (FIGS. 2,3,4) said electrically conductive controlled heat transfer means further comprises a resilient metal element having predetermined engagement surfaces between respectively, at least one of: said metal sleeve (8); the inner wall of the opening in the insulating body (7); engagement with said glass rod (1) via said mass (2).

13. Combination according to claim 12, wherein (FIG. 2) said sheet metal element comprises a radially resilient strip of sheet metal, surrounding, at least in part, said glass rod.

14. Combination according to claim 12, wherein (FIGS. 3,4) said sheet metal element comprises axially resilient sheet metal means (20,21).

15. Combination according to claim 14, wherein (FIG. 3) said axially resilient sheet metal means comprises a corrugated bellows-like axially resilient sheet having predetermined engagement surface area on said glass rod (1) and on the inner wall defining the opening of the insulator (7) espectively.

16. Combination according to claim 14, wherein said axially resilient sheet metal means comprises (FIG. 4) a stack of disk springs.

17. Combination according to claim 14, wherein said axially resilient sheet metal means are located within said opening in compression, with compressive force determined by the spacing distance between the sleeve (8) and the connection terminal (10);

and said insulating body (7) is formed with a thread in the region of attachment of said connection terminal, said connection terminal being threaded into the thread to control the axial bias being exerted on said axially resilient sheet metal means.

18. Combination according to claim 1, further including heat transfer connection elements (12,12a) located between the insulator (7) and the metal housing, to provide for sealing and heat transfer connection and secure positioning of the insulator within the housing.

* * * * *